US011090877B2

(12) United States Patent
Mochev et al.

(10) Patent No.: US 11,090,877 B2
(45) Date of Patent: Aug. 17, 2021

(54) METHOD FOR WELDING MOLDED BODIES

(71) Applicant: BASF SE, Ludwigshafen am Rhein (DE)

(72) Inventors: Stefan Mochev, Ludwigshafen (DE); Ulrich Endemann, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 196 days.

(21) Appl. No.: 16/302,316

(22) PCT Filed: May 5, 2017

(86) PCT No.: PCT/EP2017/060825
§ 371 (c)(1),
(2) Date: Nov. 16, 2018

(87) PCT Pub. No.: WO2017/198483
PCT Pub. Date: Nov. 23, 2017

(65) Prior Publication Data
US 2019/0291356 A1   Sep. 26, 2019

(30) Foreign Application Priority Data
May 17, 2016 (EP) .................... 16170000

(51) Int. Cl.
B29C 65/78    (2006.01)
B29C 65/10    (2006.01)
B29C 65/00    (2006.01)
B29C 65/14    (2006.01)
B29C 65/72    (2006.01)

(52) U.S. Cl.
CPC ........ B29C 65/7802 (2013.01); B29C 65/103 (2013.01); B29C 66/00141 (2013.01);
(Continued)

(58) Field of Classification Search
CPC ... B29C 65/10; B29C 65/103; B29C 65/7802; B29C 66/73921; B29C 66/73771;
(Continued)

(56) References Cited

U.S. PATENT DOCUMENTS 4,094,725 A   6/1978 Takeda et al.
4,450,038 A   5/1984 Ishii et al.
(Continued)

FOREIGN PATENT DOCUMENTS

DE    69213849 T2        1/1997
DE    10019300 A1 * 10/2001 ......... B29C 65/1432
(Continued)

OTHER PUBLICATIONS

International Search Report for International Patent Application No. PCT/EP2017/060825, dated Jul. 20, 2017, 3 pages.
(Continued)

Primary Examiner — Carson Gross
(74) Attorney, Agent, or Firm — Armstrong Teasdale LLP

(57) ABSTRACT

A process for welding a first molding to a second molding. The process uses an implement including first and second external surfaces. Each external surface further includes a duct. An end of the first molding is heated by a hot gas while the end is at a distance from the duct-entry plane in the range from 3 mm outside the duct to 10 mm inside the duct. A junction area of the second molding is heated by a hot gas while the junction area is at a distance from the duct-entry plane in a range from 3 mm outside the duct to 10 mm inside the duct. The heated end and the heated junction area are then brought into contact with one another and cooled, forming a weld between the first molding and the second molding. Also disclosed is a welded molding obtainable by the process of the invention.

13 Claims, 7 Drawing Sheets

(52) U.S. Cl.
CPC ........ *B29C 66/0342* (2013.01); *B29C 66/114* (2013.01); *B29C 66/1142* (2013.01); *B29C 66/30223* (2013.01); *B29C 66/43* (2013.01); *B29C 66/71* (2013.01); *B29C 66/712* (2013.01); *B29C 66/73116* (2013.01); *B29C 66/73118* (2013.01); *B29C 66/73771* (2013.01); *B29C 66/73772* (2013.01); *B29C 66/73773* (2013.01); *B29C 66/73774* (2013.01); *B29C 66/73921* (2013.01); *B29C 66/80* (2013.01); *B29C 66/91411* (2013.01); *B29C 66/91413* (2013.01); *B29C 66/91933* (2013.01); *B29C 66/91943* (2013.01); *B29C 66/9592* (2013.01); *B29C 65/1412* (2013.01); *B29C 65/1432* (2013.01); *B29C 65/72* (2013.01); *B29C 66/7212* (2013.01); *B29C 66/919* (2013.01); *B29C 66/91445* (2013.01); *B29C 66/91935* (2013.01); *B29C 66/91945* (2013.01); *B29C 66/949* (2013.01)

(58) Field of Classification Search
CPC ........ B29C 66/73772; B29C 66/73773; B29C 66/73774; B29C 66/1142; B32B 37/04
See application file for complete search history.

(56) References Cited

U.S. PATENT DOCUMENTS

| | | | |
|---|---|---|---|
| 2007/0181654 A1* | 8/2007 | Knapp | .............. B29C 66/52431 |
| | | | 228/234.1 |
| 2011/0024038 A1 | 2/2011 | Mori | |
| 2013/0248083 A1* | 9/2013 | Takahashi | ........... B29C 65/7437 |
| | | | 156/92 |

FOREIGN PATENT DOCUMENTS

| | | |
|---|---|---|
| DE | 10019300 A1 | 10/2001 |
| DE | 102007026163 A1 | 12/2008 |
| EP | 1415789 A1 | 5/2004 |
| WO | 2017178533 A1 | 10/2017 |

OTHER PUBLICATIONS

English Translation of International Preliminary Report on Patentablity for International Patent Application No. PCT/EP2017/060825, dated Nov. 22, 2018, 8 pages.

* cited by examiner

METHOD FOR WELDING MOLDED BODIES

CROSS-REFERENCE TO RELATED APPLICATIONS

This application is a U.S. National Phase Application of PCT/EP2017/060825, filed May 5, 2017, which claims the benefit of priority to EP Application No. 16170000.0, filed May 17, 2016, the contents of which are hereby expressly incorporated by reference in their entirety.

DESCRIPTION

The present invention relates to a process for the welding of a first molding (1a) to a second molding (1b). To this end, an implement (5) is used which has a first external area (6a) and a second external area (6b), where the first external area (6a) comprises a duct (7a) and the second external area (6b) comprises a duct (7b). The end (2a) of the first molding (1a) is heated by a hot gas while the location of the end (2a) is at a distance (Xa) from the duct-entry plane (14a) in the range from 3 mm outside the duct (7a) to 10 mm inside the duct (7a). The junction area (2b) of the second molding (1b) is likewise heated by a hot gas while the location of the junction area (2b) is at a distance (Xb) from the duct-entry plane (14b) in a range from 3 mm outside the duct (7b) to 10 mm inside the duct (7b). The heated end (2a) and the heated junction area (2b) are then brought into contact with one another and cooled, and a weld is formed between the first molding (1a) and the second molding (1b). The present invention further relates to the welded molding obtainable by the process of the invention.

Production of complex moldings, for example of hollow moldings, requires that two or more moldings be welded to one another. The prior art describes various processes for this purpose.

DE 692 13 849 describes a process for the welding of thermoplastic materials by blowing a warm gas on to the materials. Two sheets of a thermoplastic material are welded to one another here by blowing a hot inert gas which comprises helium, nitrogen and/or argon into the region between the two sheets. The temperature of the area between the two sheets thus increases and a weld is formed.

The process described in DE 692 13 849 is disadvantageous in that it is difficult to control the temperature of the hot gas, and therefore also the temperature to which the two sheets are heated; this can sometimes lead to overheating and thus to degradation of the thermoplastic material. It is moreover difficult to achieve local restriction of passage of the hot gas between the sheets.

DE 100 19 300 describes an implement which is introduced between two plastics parts requiring bonding. By use of radiated heat and a hot inert gas stream, said implement can achieve contactless heating of the plastics-part areas to be welded.

EP 1 415 789 describes a process similar to that in DE 100 19 300. An implement is likewise used here which uses firstly radiated heat and secondly a hot gas to transfer heat on to the molding areas requiring welding. The implement described in EP 1 415 789 is similar to the implement described in DE 100 19 300.

The processes described in DE 100 19 300 and EP 1 415 789 are disadvantageous in that the bores used for the bonding process are nozzle apertures, and these heat the weld region only at discrete points. It is therefore impossible to achieve uniform heating of the weld region. Instead of this, local overheating and local degradation of the polymer comprised in the plastics parts can occur; at the same time there are weld regions where the plastics part and, respectively, the polymer comprised therein does not melt sufficiently, and therefore the weld formed at these locations is weakened. If the moldings requiring welding moreover exhibit warpage, nonuniform heating is additionally exacerbated. The resultant temperature variations along the weld region result in different degrees of melting of the polymer; this leads to quality variations along the weld.

DE 10 2007 026 163 describes an implement and a process for the welding of thermoplastic parts. The plastic here is heated with the aid of the implement by radiated heat and at the same time by treatment with a hot gas via convection. A gas-air mixture is used as hot gas. The plastics parts are positioned so that the location of the junction areas is over the air-outflow apertures.

US 2011/0024038 likewise describes an implement, and also a process, for the welding of two plastics parts. Again, this process begins by positioning the two plastics parts over nozzles; hot air is then blown from the nozzles onto the locations that are to be bonded to one another. The junction areas are then brought into contact with one another under pressure, and the plastics parts are thus welded to one another.

U.S. Pat. No. 4,094,725 likewise describes a process for the welding of thermoplastic parts by a hot gas. The plastics parts here are respectively positioned over nozzles, heated by the gas and finally pressed together.

U.S. Pat. No. 4,450,038 relates to an implement, and also a process, for the welding of thermoplastic parts, where the softening points of the two materials of the thermoplastic parts are different. The welding is achieved by means of hot air, which is blown through a nozzle.

The processes and implements described in DE 10 2007 026 163, US 2011/0024038, U.S. Pat. Nos. 4,094,725 and 4,450,038 are similar to those of DE 10019300 and EP 1 415 789. It is disadvantageous here that the apertures for the heating of the weld region are nozzle apertures, and that these only heat the weld region at discrete points. Local overheating, and local degradation of the polymer comprised in the plastics parts, can therefore occur because uniform heating of the weld region via nozzle apertures is impossible. At the same time, there are weld regions where the plastics part does not melt sufficiently, and therefore the weld formed at these locations is weaker. In these processes again, possible warpage of the moldings additionally exacerbates the nonuniform heating. This additionally leads to quality variations along the weld.

The object on which the present invention is based therefore consists in provision of a process which is intended for the welding of a first molding to a second molding and which does not have the disadvantages described above for the processes of the prior art, or has these only to a reduced extent. The process is moreover intended to be very simple and inexpensive to carry out.

Said object is achieved via a process for the welding of a first molding (1a) to a second molding (1b), where the first molding (1a) comprises a first lateral area (3a), a second lateral area (4a) and an end (2a), which comprises a first thermoplastic polymer, and where the second molding (1b) comprises a junction area (2b) which comprises a second thermoplastic polymer,
comprising the steps of
a) provision of the first molding (1a),
b) provision of the second molding (1b),
c) provision of an implement (5) which has a first external area (6a) and a second external area (6b), where the first external area (6a) comprises a duct (7a), and where the duct (7a) has a floor (10a), a first duct wall (8a) with a first highest point (12a) and a second duct wall (9a) with a second highest point (13a), where the floor (10a) comprises means (11a) for the introduction of gas into the duct (7a), where a duct-entry plane (14a) runs through the first highest point (12a) parallel to the first external area (6a) and where the location of the exterior duct region (17a) is between the projection line (15a) from the first highest point (12a) along a direction running perpendicularly to the duct-entry plane (14a) and the projection line (16a) from the second highest point (13a) along a direction running perpendicularly to the duct-entry plane (14a), where the second external area (6b) comprises a duct (7b), and where the duct (7b) has a floor (10b), a first duct wall (8b) with a first highest point (12b) and a second duct wall (9b) with a second highest point (13b), where the floor (10b) comprises means (11b) for the introduction of gas into the duct (7b), where a duct-entry plane (14b) runs through the first highest point (12b) parallel to the second external area (6b) and where the location of the exterior duct region (17b) is between the projection line (15b) from the first highest point (12b) along a direction running perpendicularly to the duct-entry plane (14b) and the projection line (16b) from the second highest point (13b) along a direction running perpendicularly to the duct-entry plane (14b), d) positioning of the first molding (1a), where
the distance (Xa) of the end (2a) from the duct-entry plane (14a) in a direction running perpendicularly to the duct-entry plane (14a) is in the range from 3 mm outside the duct (7a) to 10 mm inside the duct (7a), where
if the distance (Xa) is in the range from >0 mm to 3 mm outside the duct (7a), the location of the end (2a) is at least to some extent in the exterior duct region (17a),
and if the distance (Xa) is in the range from 0 mm to 10 mm inside the duct (7a), the minimal distance (Y1a) of the first lateral area (3a) from the first duct wall (8a) is in the range from 0.2 to 5 mm, and the minimal distance (Y2a) of the second lateral area (4a) from the second duct wall (9a) is in the range from 0.2 to 5 mm, e) positioning of the second molding (1b), where
the distance (Xb) of the junction area (2b) from the duct-entry plane (14b) in a direction running perpendicularly to the duct-entry plane (14b) is in the range from 3 mm outside the duct (7b) to 10 mm inside the duct (7b), where
if the distance (Xb) is in the range from >0 mm to 3 mm outside the duct (7b), the junction area (2b) is at least to some extent in the exterior duct region (17b),
and if the distance (Xb) is in the range from 0 mm to 10 mm inside the duct (7b), the second molding (1b) additionally has a first lateral area (3b) and a second lateral area (4b) and the minimal distance (Y1b) of the first lateral area (3b) from the first duct wall (8b) is in the range from 0.2 to 5 mm, and where the minimal distance (Y2b) of the second lateral area (4b) from the second duct wall (9b) is in the range from 0.2 to 5 mm, f) introduction of a hot gas via the means (11a) for the introduction of gas into the duct (7a), where the temperature of the end (2a) of the first molding (1a) increases and where the first thermoplastic polymer comprised in the end (2a) melts, g) introduction of a hot gas via the means (11b) for the introduction of gas into the duct (7b), where the temperature of the junction area (2b) of the second molding (1b) increases and where the second thermoplastic polymer comprised in the junction area (2b) melts, h) removal of the first molding (1a) from the position achieved in step d), i) removal of the second molding (1b) from the position achieved in step e), j) bringing of the heated end (2a) of the first molding (1a) into contact with the heated junction area (2b) of the second molding (1b) and cooling of the heated end (2a) of the first molding (1a) and of the heated junction area (2b) of the second molding (1b) while the heated end (2a) and the heated junction area (2b) are in contact with one another to form a weld between the first molding (1a) and the second molding (1b).

Surprisingly, it has been found that with the process of the invention it is possible to achieve more uniform heating of the end (2a) of the first molding (1a) and of the junction area (2b) of the second molding (1b); better weld qualities are thus obtained. The better weld qualities result from greater uniformity of melting of the first thermoplastic polymer in step f) and of the second thermoplastic polymer in step g); this respectively gives a more uniform thickness of the melt layer, which then leads to a particularly uniform thickness of the weld. In particular, mechanical strengths achieved are higher than in processes of the type described in the prior art.

The process of the invention can moreover be carried out more rapidly than the processes described in the prior art, and therefore gives shorter cycle times than the processes described in the prior art.

For the purposes of the present invention, the expression "cycle time" means the period from the start of positioning of the first molding (1a) and of the second molding (1b) in the steps d) and e) to production of the weld between the first molding (1a) and the second molding (1b) in step j).

If the positioning of the first molding (1a) in step d) and of the second molding (1b) in step e) does not take place simultaneously, the expression "the start of positioning" means the start of positioning of that molding which is positioned first. The expression "cycle time" then therefore means the period from the start of positioning of the molding that is positioned first to production of the weld between the first molding (1a) and the second molding (1b) in step j).

The cycle time in the process of the invention is by way of example in the range from 5 to 40 s (seconds), preferably in the range from 5 to 25 s and with particular preference in the range from 5 to 20 s.

DETAILED DESCRIPTION

Figure 1A:
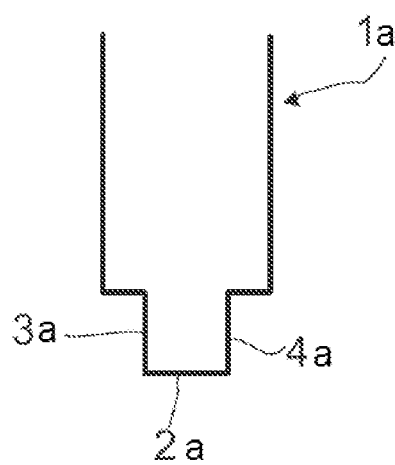
FIGS. 1a, 1b, 1c, 1d, and 1e show moldings in accordance with the present disclosure.

The process of the invention is explained in more detail below.

Step a)

In step a) the first molding (1a) is provided.

In the invention, the first molding (1a) comprises a first lateral area (3a), a second lateral area (4a) and an end (2a). The end (2a) comprises a first thermoplastic polymer.

For the purposes of the present invention, the expression "a first thermoplastic polymer" means either precisely one first thermoplastic polymer or else a mixture of two or more first thermoplastic polymers.

Any of the thermoplastic polymers known to the person skilled in the art is suitable as first thermoplastic polymer. It is preferable that the first thermoplastic polymer is selected from the group consisting of amorphous thermoplastic polymers and semicrystalline thermoplastic polymers.

The first thermoplastic polymer is therefore by way of example selected from the group consisting of polyamides, polyoxymethylenes, polysulfones, polyphenylene sulfones and polybutylene terephthalates.

The present invention therefore also provides a process in which the first thermoplastic polymer comprised in the end (2a) is selected from the group consisting of polyamides, polyoxymethylenes, polysulfone, polyphenylene sulfone and polybutylene terephthalates.

The first thermoplastic polymer usually has a glass transition temperature ($T_{G1}$). The glass transition temperature ($T_{G1}$) of the first thermoplastic polymer is by way of example in the range from 50 to 350° C., preferably in the range from 150 to 270° C. and with particular preference in the range from 170 to 240° C., determined by means of differential scanning calorimetry (DSC).

The present invention therefore also provides a process in which the glass transition temperature ($T_{G1}$) of the first thermoplastic polymer is in the range from 50 to 350° C.

If the first thermoplastic polymer is a semicrystalline thermoplastic polymer, the first thermoplastic polymer usually additionally has a melting point ($T_{M1}$). The melting point ($T_{M1}$) of the first thermoplastic polymer is by way of example then in the range from 80 to 400° C., preferably in the range from 140 to 320° C. and with particular preference in the range from 160 to 300° C., determined by means of differential scanning calorimetry (DSC).

The present invention therefore also provides a process in which, if the first thermoplastic polymer is a semicrystalline thermoplastic polymer, the melting point ($T_{M1}$) of the first thermoplastic polymer is in the range from 80 to 400° C.

The end (2a) of the first molding (1a) can comprise not only the first thermoplastic polymer but also other components. These other components are known to the person skilled in the art and are by way of example selected from the group consisting of fillers and additives.

Suitable fillers are any of the fillers known to the person skilled in the art for thermoplastic polymers. Examples of these fillers are selected from the group consisting of glass beads, glass fibers, carbon fibers, carbon nanotubes and chalk.

Suitable additives are likewise known to the person skilled in the art and are by way of example selected from the group consisting of antinucleating agents, stabilizers, terminal-group functionalizers and dyes.

The first molding (1a) preferably comprises the first thermoplastic polymer. With particular preference, the components comprised in the first molding (1a) are the same as those comprised in the end (2a). If, therefore, the end (2a) comprises not only the first thermoplastic polymer but also other components, it is preferable that the first molding (1a) likewise comprises not only the first thermoplastic polymer but also the other components.

The statements and preferences above then apply correspondingly to the percentages by weight of the first thermoplastic polymer and of the other components.

The shape of the end (2a) of the first molding (1a) can be any of the shapes known to the person skilled in the art. By way of example, the end (2a) can be flat, angular or linear. The end (2a) then therefore by way of example has a flat shape, a linear shape or an angular shape.

By way of example, the end (2a) is flat if the first lateral area (3a), the second lateral area (4a) and the end (2a) together form a rib.

If the first lateral area (3a), the second lateral area (4a) and the end (2a) together form a convex shape, for example with semicircular cross section, the end is linear.

The shape of the end (2a) is by way of example angular if the first lateral area (3a) and the second lateral area (4a) meet one another at an acute angle.

The shape of the first lateral area (3a) and of the second lateral area (4a) can likewise be any of the shapes known to the person skilled in the art. It is preferable that the shape of the first lateral area (3a) and of the second lateral area (4a) is flat. In particular, it is preferable here that the orientation of the first lateral area (3a) is in essence parallel to the second lateral area (4a).

For the purposes of the present invention, the expression "in essence parallel" means not only a precisely parallel orientation of the first lateral area (3a) and of the second lateral area (4a), but also a deviation of at most 30°, preferably at most 15° and with particular preference at most 1° from parallel orientation.

The present invention therefore also provides a process in which the orientation of the first lateral area (3a) of the first molding (1a) is in essence parallel to the second lateral area (4a) of the first molding (1a).

It is moreover preferable that the shape of the end (2a) is flat and that the orientation of the first lateral area (3a) is in essence perpendicular to the end (2a) and that the orientation of the second lateral area (4a) is in essence perpendicular to the end (2a). In this embodiment it is preferable that the first lateral area (3a), the second lateral area (4a) and the end (2a) form a rib of the first molding (1a).

The present invention moreover provides a process in which the shape of the end (2a) of the first molding (1a) is flat and the orientation of the first lateral area (3a) and of the second lateral area (4a) of the first molding (1a) is respectively in essence perpendicular to the end (2a).

For the purposes of the present invention, the expression "in essence perpendicular" means not only a precisely perpendicular orientation of the first lateral area (3a) with respect to the end (2a) but also a deviation of at most +/−30°, preferably at most +/−15° and with particular preference at most +/−1° from perpendicular orientation.

Corresponding statements apply in connection with in essence perpendicular orientation of the second lateral area (4a) with respect to the end (2a).

The first molding (1a) can be provided in step a) by any of the methods known to the person skilled in the art, for example by means of injection molding, extrusion or blow molding.

These processes are known per se to the person skilled in the art.

Step b)

In step b) the second molding (1b) is provided. The second molding (1b) comprises a junction area (2b). This junction area (2b) comprises a second thermoplastic polymer.

For the purposes of the present invention, the expression "a second thermoplastic polymer" means either precisely one second thermoplastic polymer or else a mixture of two or more second thermoplastic polymers.

The statements and preferences above relating to the first thermoplastic polymer comprised in the end (2a) apply correspondingly to the second thermoplastic polymer comprised in the junction area (2b).

The present invention therefore also provides a process in which the second thermoplastic polymer comprised in the junction area (2b) is selected from the group consisting of polyamides, polyoxymethylenes, polysulfone, polyphenylene sulfone and polybutylene terephthalates.

The present invention therefore also provides a process in which the first thermoplastic polymer comprised in the end (2a) is selected from the group consisting of polyamides, polyoxymethylenes, polysulfone, polyphenyl sulfone and polybutylene terephthalates, and/or the second thermoplastic polymer comprised in the junction area (2b) is selected from the group consisting of polyamides, polyoxymethylenes, polysulfone, polyphenyl sulfone and polybutylene terephthalates.

It is particularly preferable that the first thermoplastic polymer comprised in the end (2a) and the second thermoplastic polymer comprised in the junction area (2b) are identical. The present invention therefore also provides a process in which the first thermoplastic polymer comprised in the end (2a) and the second thermoplastic polymer comprised in the junction area (2b) are identical.

If the first thermoplastic polymer and the second thermoplastic polymer are identical, this means that the first thermoplastic polymer is the same thermoplastic polymer as the second thermoplastic polymer. It is particularly preferable that the first thermoplastic polymer and the second thermoplastic polymer have been produced by the same process and therefore have the same properties, for example the same melting point, the same molecular weight distribution, the same molecular weight and the same melt viscosity.

The second thermoplastic polymer usually has a glass transition temperature ($T_{G2}$). The glass transition temperature ($T_{G2}$) of the second thermoplastic polymer is by way of example in the range from 50 to 350° C., preferably in the range from 150 to 270° C. and with particular preference in the range from 170 to 240° C., determined by means of differential scanning calorimetry (DSC).

The present invention therefore also provides a process in which the glass transition temperature ($T_{G2}$) of the second thermoplastic polymer is in the range from 50 to 350° C.

If the second thermoplastic polymer is a semicrystalline thermoplastic polymer, the second thermoplastic polymer usually additionally has a melting point ($T_{M2}$). The melting point ($T_{M2}$) of the second thermoplastic polymer is by way of example then in the range from 80 to 400° C., preferably in the range from 140 to 320° C. and with particular preference in the range from 160 to 300° C., determined by means of differential scanning calorimetry (DSC).

The present invention therefore also provides a process in which, if the second thermoplastic polymer is a semicrystalline thermoplastic polymer, the melting point ($T_{M2}$) of the second thermoplastic polymer is in the range from 80 to 400° C.

The junction area (2b) of the second molding (1b) can comprise not only the second thermoplastic polymer but also other components. The statements and preferences above for the other components optionally comprised in the end (2a) apply correspondingly to the other components optionally comprised in the junction area (2b). The second molding (1b) preferably comprises the second thermoplastic polymer. With particular preference, the components comprised in the second molding (1b) are the same as those comprised in the junction area (2b). If, therefore, the junction area (2b) comprises not only the second thermoplastic polymer but also other components, it is preferable that the second molding (1b) likewise comprises not only the second thermoplastic polymer but also the other components.

It is preferable that the shape of the junction area (2b) of the second molding (1b) is flat.

It is preferable that the second molding (1b) additionally has a first lateral area (3b) and a second lateral area (4b). The statements and preferences above relating to the first lateral area (3a) and the second lateral area (4a) of the first molding (1a) then apply correspondingly to the first lateral area (3b) and the second lateral area (4b).

In this embodiment, the junction area (2b) of the second molding (1b) corresponds to the end (2a) of the first molding (1a). In this embodiment, the statements and preferences above relating to the end (2a) of the first molding (1a) therefore apply correspondingly to the junction area (2b) of the second molding (1b).

The present invention therefore also provides a process in which the orientation of the first lateral area (3b) from the second molding (1b) is in essence parallel to the second lateral area (4b) from the second molding (1b).

For the purposes of the present invention, the expression "in essence parallel" means not only a precisely parallel orientation of the first lateral area (3b) and of the second lateral area (4b), but also a deviation of at most 30°, preferably at most 15° and with particular preference at most 1° from parallel orientation.

The present invention moreover provides a process in which the shape of the junction area (2b) from the second molding (1b) is flat and the orientation of the first lateral area (3b) and of the second lateral area (4b) from the second molding (1b) is respectively in essence perpendicular to the junction area (2b).

For the purposes of the present invention, the expression "in essence perpendicular" means either that the orientation of the first lateral area (3b) and of the second lateral area (4b) is respectively mutually independently precisely perpendicular to the junction area (3b) or else that the deviation from precisely perpendicular orientation can respectively be at most +/−30°, preferably at most +/−15° and with particular preference at most +/−1°.

FIGS. 1a to 1e show by way of example moldings (1a) of the invention. Identical reference signs in FIGS. 1a to 1e have identical meaning. In FIGS. 1a to 1d, the molding (1a) has a first lateral area (3a), a second lateral area (4a) and an end (2a).

Figure 1B:
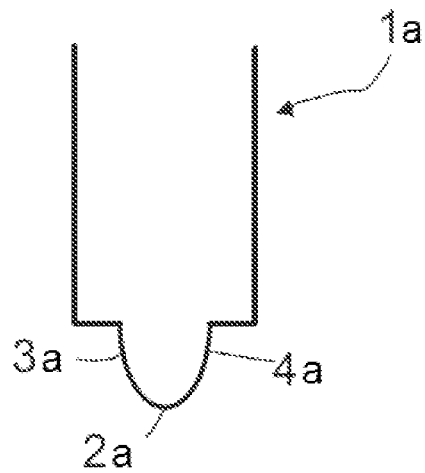
Figure 1C:
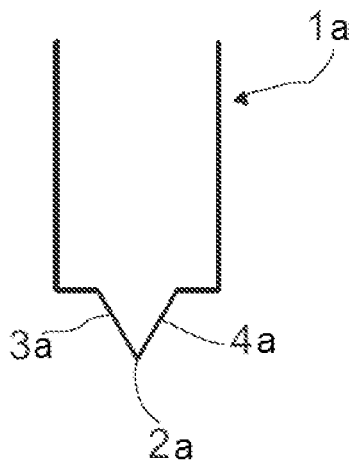
Figure 1D:
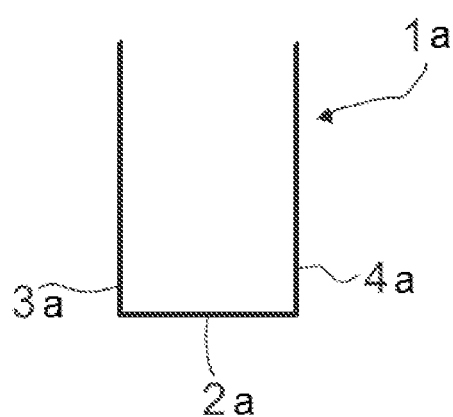

In FIGS. 1a and 1d, the shape of the end (2a) is respectively flat. The orientation of the first lateral area (3a) and of the second lateral area (4a) is parallel to one another, and respectively perpendicular to the end (2a). In FIG. 1a, the first lateral area (3a), the second lateral area (4a) and the end (2a) together form a rib of the molding (1a).

In FIG. 1b, the shape of the end (2a) is linear. The first lateral area (3a), the second lateral area (4a) and the end (2a) together form a convex shape.

In FIG. 1c, the shape of the end (2a) is angular. The first lateral area (3a) and the second lateral area (4a) meet one another at an acute angle at the end (2a).

Figure 1E:
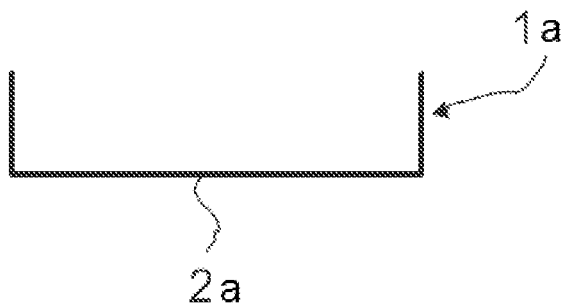

The molding (1a) shown in FIG. 1e has only a junction area (2a). The junction area (2a) can be the entire area represented by the reference sign (2a) in FIG. 1e; the junction area can equally also comprise only a portion of this area.

FIGS. 6a to 6e show by way of example moldings (1b) of the invention. Identical reference signs in FIGS. 6a to 6e have identical meaning. In FIGS. 6a to 6d, the molding (1b) has a first lateral area (3b), a second lateral area (4b) and an end (2b). The statements and preferences above relating to FIGS. 1a to 1e then apply correspondingly to FIGS. 6a to 6e.

Step c)

In step c), an implement (5) is provided. The implement (5) has a first external area (6a) and a second external area (6b).

The first external area (6a) comprises a duct (7a). The duct (7a) has a floor (10a), a first duct wall (8a) with a first highest point (12a) and a second duct wall (9a) with a second highest point (13a). The floor (10a) comprises means (11a) for the introduction of gas into the duct (7a). A duct-entry plane (14a) runs through the first highest point (12a) parallel to the first external area (6a). The location of the exterior duct region (17a) is between the projection line (15a) from the first highest point (12a) along a direction running perpendicularly to the duct-entry plane (14a) and the projection line (16a) from the second highest point (13a) along a direction running perpendicularly to the duct-entry plane (14a).

The arrangement can have the duct (7a) either above the first external area (6a) or else at least to some extent within the first external area (6a). If the arrangement has the duct above the first external area (6a), the first duct wall (8a) and the second duct wall (9a) have by way of example been secured on the first external area (6a), for example by welding, and thus form the duct (7a).

The projection line (15a) from the first highest point (12a) along a direction running perpendicularly to the duct-entry plane (14a) is the straight line that is perpendicular to the duct-entry plane (14a) and that runs through the first highest point (12a).

Corresponding considerations apply to the projection line (16a) from the second highest point (13a) along a direction running perpendicularly to the duct-entry plane (14a). The projection line (16a) from the second highest point (13a) along a direction running perpendicularly to the duct-entry plane (14a) is the straight line that is perpendicular to the duct-entry plane (14a) and that runs through the second highest point (13a).

The first highest point (12a) of the first duct wall (8a) is the point that, in a perpendicular direction, is most distant from the plane of the floor (10a) of the duct (7a) of the first external area (6a), i.e. that exhibits the largest distance in perpendicular direction from the plane of the floor (10a). If the first duct wall (8a) has two or more highest points, the first highest point (12a) is the highest point that exhibits the smallest distance from the duct (7a).

Corresponding considerations apply to the second highest point (13a).

The second highest point (13a) of the second duct wall (9a) is the point that, in a perpendicular direction, is most distant from the plane of the floor (10a) of the duct (7a) of the first external area (6a), i.e. that exhibits the largest distance in perpendicular direction from the plane of the floor (10a).

If the second duct wall (9a) has two or more highest points, the second highest point (13a) is the highest point that exhibits the smallest distance from the duct (7a).

If the first highest point (12a) and the second highest point (13a) exhibit a different distance in perpendicular direction from the plane of the floor (10a), the first highest point (12a) is the highest point that exhibits the smaller distance in perpendicular direction from the plane of the floor (10a). The highest point that exhibits the larger distance in perpendicular direction from the plane of the floor (10a) is then the second highest point (13a).

The distance of the first highest point (12a) from the plane of the floor (10a) in a perpendicular direction is by way of example in the range from 2 to 30 mm, preferably in the range from 5 to 20 mm and with particular preference in the range from 11 to 15 mm.

The term duct depth is also used for the distance between the first highest point (12a) and the plane of the floor (10a) in a perpendicular direction. The duct depth is therefore by way of example in the range from 2 to 30 mm, preferably in the range from 5 to 20 mm and with particular preference in the range from 11 to 15 mm.

The distance of the second highest point (13a) from the plane of the floor (10a) in a perpendicular direction is by way of example in the range from 2 to 30 mm, preferably in the range from 5 to 20 mm and with particular preference in the range from 11 to 15 mm.

The floor (10a) of the duct (7a) can have any of the shapes known to the person skilled in the art. By way of example, its shape can be planar or curved. The shape of the floor (10a) is preferably planar, i.e. flat.

In the invention, the plane of the floor (10a) is the plane that runs parallel to the duct-entry plane (14a) and through the point at which a center line (Ma) intersects the floor (10a), where the center line (Ma) runs perpendicularly through the duct-entry plane (14a) and is equidistant respectively from the projection line (15a) of the first highest point (12a) and the projection line (16a) of the second highest point (13a). The center line (Ma) moreover runs parallel to the projection line (15a) and the projection line (16a).

It is clear to the person skilled in the art that if the center line (Ma) runs through the means (11a) for the introduction of gas into the duct (7a) and if therefore there is no point at which the center line (Ma) intersects the floor (10a), the point of intersection of the center line (Ma) with the floor (10a) is assumed to be that at which it would lie if the means (11a) for the introduction of gas into the duct (7a) were not comprised in the floor (10a).

In the invention, the floor (10a) comprises means (11a) for the introduction of gas into the duct (7a).

Suitable means (11a) for the introduction of gas into the duct (7a) are any of the means (11a) known to the person skilled in the art that are suitable for the introduction of gas, examples being nozzles, bores and/or slits.

The means (11a) for the introduction of gas into the duct (7a) usually has a highest point.

The highest point of the means (11a) for the introduction of gas into the duct (7a) is within the duct. The highest point of the means (11a) for the introduction of gas into the duct (7a) is that point of the means (11a) for the introduction of gas into the duct (7a) that exhibits the smallest distance from the duct-entry plane (14a) in a direction running perpendicularly to the duct-entry plane (14a). It is particularly preferable that the highest point of the means (11a) for the introduction of gas into the duct (7a) is at a distance of >10 mm from the duct-entry plane (14a), within the duct (7a), in a direction running perpendicularly to the duct-entry plane (14a).

In another preferred embodiment of the present invention, the highest point of the means (11a) for the introduction of gas into the duct (7a) is at a distance in the range from 1 to 8.5 mm from the duct-entry plane (14a) in a direction running perpendicularly to the duct-entry plane (14a).

It is self-evident that the distance of the highest point of the means (11a) for the introduction of gas into the duct (7a) from the duct-entry plane (14a) in a direction running perpendicularly to the duct-entry plane (14a) is usually so great that during the positioning in step d) the end (2a) of the first molding (1a) does not touch the highest point of the means (11a) for the introduction of gas into the duct (7a).

It is therefore further preferable that the distance of the highest point of the means (11a) for the introduction of gas into the duct (7a) from the duct-entry plane (14a) in a direction running perpendicularly to the duct-entry plane (14a) is so great that during the positioning of the first molding (1a) in step d) the distance of the end (2a) of the first molding (1a) from the highest point of the means (1a) for the introduction of gas into the duct (7a) in a direction running perpendicularly to the duct-entry plane (14a) is at least 0.5 mm.

The orientation of the first duct wall (8a) preferably is in essence parallel to the second duct wall (9a).

For the purposes of the present invention, the expression "in essence parallel" means either a precisely parallel orientation of the first duct wall (8a) and of the second duct wall (9a), or else a deviation of at most 30°, preferably at most 15° and with particular preference at most 1° from parallel orientation.

The present invention therefore also provides a process in which the orientation of the first duct wall (8a) of the duct (7a) of the first external area (6a) is in essence parallel to the second duct wall (9a) of the duct (7a) of the first external area (6a).

It is moreover preferable that the orientation of the first duct wall (8a) is in essence perpendicular to the plane of the floor (10a). It is likewise preferable that the orientation of the second duct wall (9a) is in essence perpendicular to the plane of the floor (10a).

The present invention moreover provides a process in which the orientation of the first duct wall (8a) of the duct (7a) is in essence perpendicular to the plane of the floor (10a) and the orientation of the second duct wall (9a) of the duct (7a) is in essence perpendicular to the plane of the floor (10a).

It is in particular preferable that the shape of the floor (10a) is flat and that the orientation of the first duct wall (8a) and of the second duct wall (9a) is respectively in essence perpendicular to the floor (10a).

For the purposes of the present invention, the expression "in essence perpendicular" means either a respectively mutually independently precisely perpendicular orientation of the first duct wall (8a) and of the second duct wall (9a) with respect to the plane of the floor (10a) or else respectively mutually independently a deviation of at most +/−30°, preferably of at most +/−15° and particularly preferably of at most +/−1° from the perpendicular orientation.

The first duct wall (8a), the second duct wall (9a) and the floor (10a) can be composed of any of the materials that are suitable for use at the temperatures at which the process of the invention is carried out.

The first duct wall (8a), the second duct wall (9a) and the floor (10a) can moreover be heatable.

In the invention, the second external area (6b) comprises a duct (7b). The duct (7b) has a floor (10b), a first duct wall (8b) with a first highest point (12b) and a second duct wall (9b) with a second highest point (13b). The floor (10b) comprises means (11b) for the introduction of gas into the duct (7b). A duct-entry plane (14b) runs through the first highest point (12b), parallel to the second external area (6b). The location of the exterior duct region (17b) is between the projection line (15b) of the first highest point (12b) along a direction running perpendicularly to the duct-entry plane (14b) and the projection line (16b) of the second highest point (13b) along a direction running perpendicularly to the duct-entry plane (14b).

The statements and preferences above for the first external area (6a) apply correspondingly to the second external area (6b).

The statements and preferences above for the duct (7a) likewise apply correspondingly to the duct (7b). Corresponding considerations apply to the floor (10b), the first duct wall (8b) with the first highest point (12b), the second duct wall (9b) with the second highest point (13b) and the means (11b) for the introduction of gas into the duct (7b). These are correspondingly subject to the statements and preferences above for the floor (10a), the first duct wall (8a) with the first highest point (12a), the second duct wall (9a) with the second highest point (13a) and the means (11a) for the introduction of gas into the duct (7a).

The present invention therefore also provides a process in which the orientation of the first duct wall (8b) of the duct (7b) of the second external area (6b) is in essence parallel to the second duct wall (9b) of the duct (7b) of the second external area (6b).

For the purposes of the present invention, the expression "in essence parallel" means either a precisely parallel orientation of the first duct wall (8b) and of the second duct wall (9b) or else a deviation of at most 30°, preferably at most 15° and with particular preference at most 1° from parallel orientation.

The present invention therefore also provides a process in which the orientation of the first duct wall (8a) of the duct (7a) of the first external area (6a) is in essence parallel to the second duct wall (9a) of the duct (7a) of the first external area (6a) and/or the orientation of the first duct wall (8b) of the duct (7b) of the second external area (6b) is in essence parallel to the second duct wall (9b) of the duct (7b) of the second external area (6b).

The present invention moreover provides a process in which the orientation of the first duct wall (8b) of the duct (7b) is in essence perpendicular to the plane of the floor (10b) and the orientation of the second duct wall (9b) of the duct (7b) is in essence perpendicular to the plane of the floor (10b).

For the purposes of the present invention, the expression "in essence perpendicular" means either a respectively mutually independently precisely perpendicular orientation of the first duct wall (8b) and of the second duct wall (9b) with respect to the plane of the floor (10b) or else respectively mutually independently a deviation of at most +/−30°, preferably of at most +/−15° and particularly preferably of at most +/−1° from the perpendicular orientation.

It is preferable in the invention that the first external area (6a) of the implement (5) provided in step c) is opposite to the second external area (6b) of the implement (5).

The present invention therefore also provides a process in which the first external area (6a) of the implement (5) provided in step c) is opposite to the second external area (6b) of the implement (5).

The term "opposite" means spatially opposite. In particular, it is preferable here that the orientation of the first external area (6a) is in essence parallel to the second external area (6b).

For the purposes of the present invention, the expression "in essence parallel" means either a precisely parallel orientation of the first external area (6a) to the second external area (6b) or else the deviation of at most 30°, preferably at most 15° and with particular preference at most 1° from parallel orientation.

There is usually connection between the first external area (6a) and the second external area (6b). By way of example, a central section (20) connects the first external area (6a) to the second external area (6b). The shape of this central section (20) can be as desired and said section can by way of example comprise means permitting introduction of gas into the means (11a) for the introduction of gas into the duct (7a) and into the means (11b) for the introduction of gas into the duct (7b). The central section (20) can moreover by way of example comprise heating plates in order to heat the gas and/or the first external area (6a), the second external area (6b), and also optionally the first duct wall (8a), (8b), the second duct wall (9a), (9b) and/or the floor (10a), (10b).

It is moreover preferable in the invention that the arrangement has the duct (7a) of the first external area (6a) opposite to the duct (7b) of the second external area (6b).

Figure 2A:
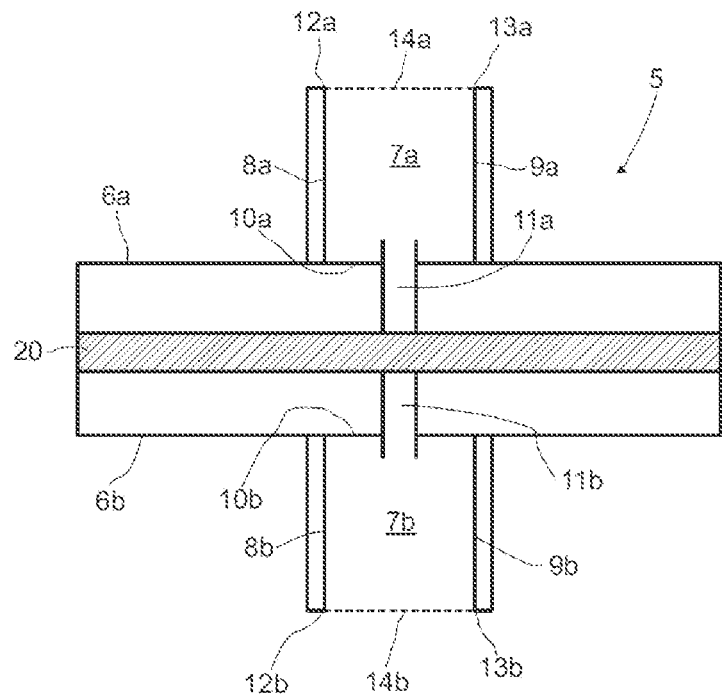
FIGS. 2a and 2b show an implement in accordance with the present disclosure.
Figure 2B:
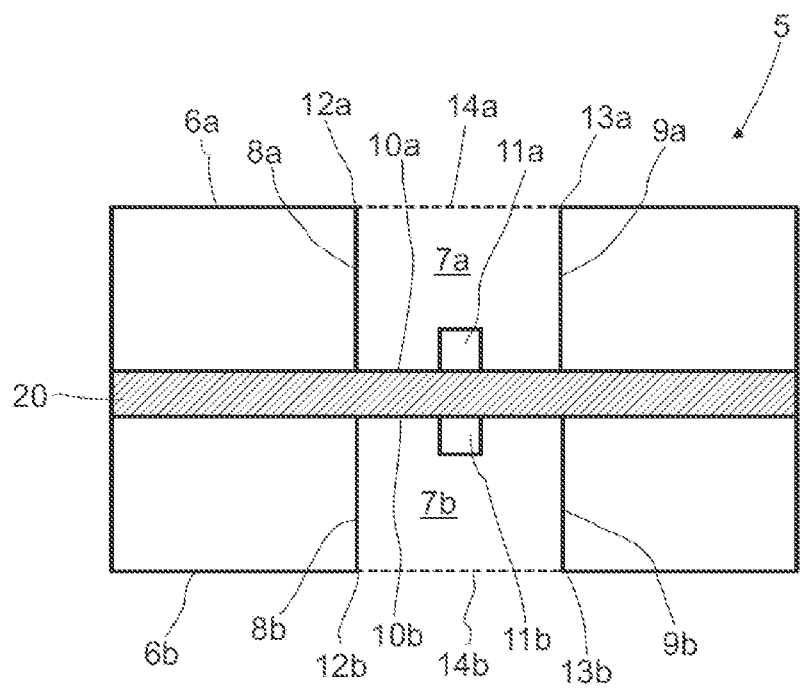

FIGS. 2a and 2b show an example of an implement 5. Identical reference signs in FIGS. 2a and 2b have identical meaning. In FIG. 2a the arrangement has the duct 7a above the first external area 6a, the arrangement likewise has the duct 7b above the second external area 6b. The first external area 6a is opposite to the second external area 6b; the duct 7a is likewise opposite to the duct 7b. The ducts 7a, 7b comprise respectively a first duct wall 8a, 8b with a first highest point 12a, 12b and a second duct wall 9a, 9b with a second highest point 13a, 13b. The first duct wall 8a, 8b and the second duct wall 9a, 9b have respectively been applied to the first external area 6a and the second external area 6b. The floors 10a, 10b comprise respectively means 11a, 11b for the introduction of gas. The duct-entry planes are indicated by the reference signs 14a and 14b.

In FIG. 2b, in contrast to FIG. 2a, the location of the ducts 7a, 7b is respectively inside of the first external area 6a and of the second external area 6b.

In FIGS. 2a and 2b, a central section 20 connects the first external area 6a to the second external area 6b. The statements and preferences above apply to the central section 20.

FIGS. 3a to 3d show examples of ducts (7a). Identical reference signs in FIGS. 3a to 3d have identical meaning. The ducts shown in FIGS. 3a to 3d can either belong to the first external area (6a) or else belong to the second external area (6b).

Figure 3A:
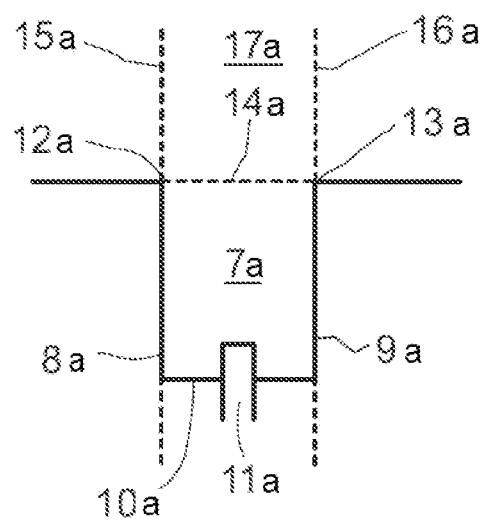
FIGS. 3a, 3b, 3c, and 3d show ducts in accordance with the present disclosure.
Figure 3B:
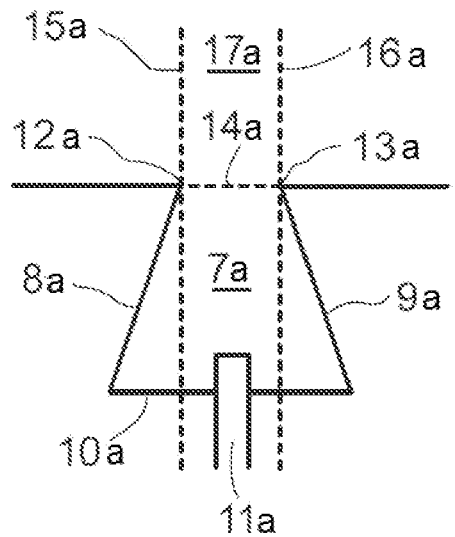
Figure 3C:
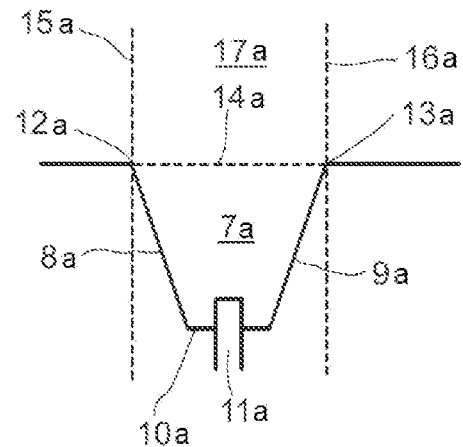

The duct (7a) shown in FIG. 3a comprises a first duct wall (8a) and a second duct wall (9a). The orientation of the first duct wall (8a) is parallel to the second duct wall (9a). The floor (10a) comprises means (11a) for the introduction of gas into the duct (7a). The first duct wall (8a) comprises a plurality of highest points. The first highest point (12a) is the highest point that is closest to the duct (7a). The second duct wall (9a) correspondingly also comprises a plurality of highest points. The second highest point (13a) is the highest point that is closest to the duct (7a). The projection line (15a) through the first highest point (12a) perpendicular to the duct-entry plane (14a) is likewise shown, as also is the projection line (16a) from the second highest point (13a) perpendicular to the duct-entry plane (14a). The location of the exterior duct region (17a) is between the projection line (15a) and the projection line (16a). Corresponding statements apply to FIGS. 3b and 3c. The ducts (7a) of FIGS. 3b and 3c differ from the duct (7a) of FIG. 3a in that the duct walls (8a) and (9a) are at different angles and are therefore not parallel to one another and not perpendicular to the plane of the floor (10a).

Figure 3D:
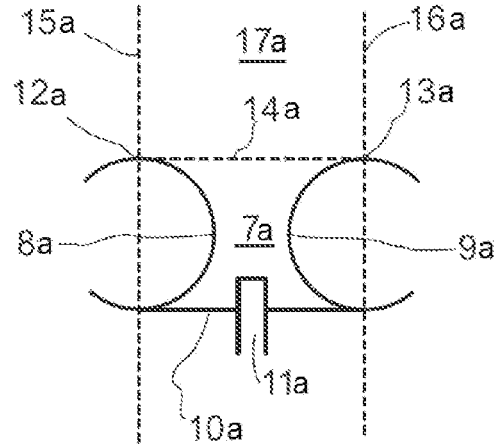

The duct shown in FIG. 3d has convex duct walls (8a), (9a). The first duct wall (8a) has precisely one first highest point (12a); the second duct wall (9a) likewise has precisely one second highest point (13a). The projection line (15a) from the first highest point (12a) perpendicular to the duct-entry plane (14a) is likewise shown, as also is the projection line (16a) from the second highest point (13a) perpendicular to the duct-entry plane (14a). The location of the exterior duct region (17a) is between the projection line (15a) and the projection line (16a).

FIGS. 7a to 7d show examples of ducts (7b). Identical reference signs in FIGS. 7a to 7d have identical meaning. The ducts shown in FIGS. 7a to 7d can either belong to the first external area (6a) or else belong to the second external area (6b). The statements and preferences above relating to FIGS. 3a to 3d then apply correspondingly to FIGS. 7a to 7d.

Step d)

In step d) the first molding (11a) is positioned. There is a distance (Xa) between the end (2a) and the duct-entry plane (14a) in a direction running perpendicularly to the duct-entry plane (14a). The distance (Xa) in the invention is in the range from 3 mm outside the duct (7a) to 10 mm inside the duct (7a). The distance (Xa) preferably is in the range from 0 mm to 10 mm inside the duct (7a) and with particular preference in the range from 0.5 mm to 8 mm respectively inside the duct (7a).

The present invention therefore also provides a process in which the first molding (1a) is positioned in step d) in such a way that the distance (Xa) is in the range from 0 to 10 mm inside the duct (7a).

It is self-evident that the distance (Xa) inside the duct (7a) is always smaller than the depth of the duct (7a).

If the distance (Xa) is in the range from >0 mm to 3 mm outside the duct (7a), the location of the end (2a) is at least to some extent in the exterior duct region (17a). It is then preferable that the location of the end (2a) is entirely in the exterior duct region (17a).

The present invention therefore also provides a process in which the first molding (11a) is positioned in step d) in such a way that if the distance (Xa) is in the range from >0 mm to 3 mm outside the duct (7a) the location of the end (2a) is entirely in the exterior duct region (17a).

For the purposes of the present invention, the term "entirely" in this context means that the location of the entire end (2a) is in the exterior duct region (17a).

If the distance (Xa) is in the range from 0 mm to 10 mm inside the duct (7a), the minimal distance (Y1a) of the first lateral area (3a) from the first duct wall (8a) is in the range from 0.2 to 5 mm. In this case, the minimal distance (Y2a) of the second lateral area (4a) from the second duct wall (9a) is in the range from 0.2 to 5 mm.

The minimal distance (Y1a) preferably is in the range from 0.5 to 4 mm and with particular preference in the range from 1 to 3 mm.

The minimal distance (Y2a) preferably is in the range from 0.5 to 4 mm and with particular preference in the range from 1 to 3 mm.

The minimal distance (Y1a) of the first lateral area (3a) from the first duct wall (8a) is the smallest distance between the first lateral area (3a) and the first duct wall (8a).

Corresponding considerations apply to the minimal distance (Y2a). The minimal distance (Y2a) of the second lateral area (4a) from the second duct wall (9a) is the smallest distance between the second lateral area (4a) and the second duct wall (9a).

In a preferred embodiment of the present invention, the following step d) is therefore carried out:
d) positioning of the first molding (1a),
where the distance (Xa) of the end (2a) from the duct-entry plane (14a) in a direction running perpendicularly to the duct-entry plane (14a) is in the range from 0 to 10 mm inside the duct (7a),
where the minimal distance (Y1a) of the first lateral area (3a) from the first duct wall (8a) is in the range from 0.2 to 5 mm, preferably in the range from 0.5 to 4 mm and with particular preference in the range from 1 to 3 mm, and
where the minimal distance (Y2a) of the second lateral area (4a) from the second duct wall (9a) is in the range from 0.2 to 5 mm, preferably in the range from 0.5 to 4 mm and with particular preference in the range from 1 to 3 mm.

The present invention therefore also provides a process in which the following step d) is carried out:
e) positioning of the first molding (1a),
where the distance (Xa) of the end (2a) from the duct-entry plane (14a) in a direction running perpendicularly to the duct-entry plane (14a) is in the range from 0 to 10 mm inside the duct (7a),
where the minimal distance (Y1a) of the first lateral area (3a) from the first duct wall (8a) is in the range from 0.2 to 5 mm, and
where the minimal distance (Y2a) of the second lateral area (4a) from the second duct wall (9a) is in the range from 0.2 to 5 mm.
Step e)

In step e) the second molding (1b) is positioned. There is a distance (Xb) between the junction area (2b) and the duct-entry plane (14b) in a direction running perpendicularly to the duct-entry plane (14b). The distance (Xb) in the invention is in the range from 3 mm outside the duct (7b) to 10 mm inside the duct (7b). The distance (Xb) preferably is in the range from 0 mm to 10 mm inside the duct (7b) and with particular preference in the range from 0.5 mm to 8 mm respectively inside the duct (7b).

The present invention therefore also provides a process in which the second molding (1b) is positioned in step e) in such a way that the distance (Xb) is in the range from 0 to 10 mm inside the duct (7b).

If the distance (Xb) is in the range from >0 mm to 3 mm outside the duct (7b), the location of the junction area (2b) is at least to some extent in the exterior duct region (17b). It is preferable that the location of the junction area (2b) is then entirely in the exterior duct region (17b).

The term "entirely" means in this context that the location of the entire junction area (2b) is in the exterior duct region (17b).

The present invention therefore also provides a process in which the second molding (1b) is positioned in step e) in such a way that if the distance (Xb) is in the range from >0 mm to 3 mm outside the duct (7b) the location of the junction area (2b) is entirely in the exterior duct region (17b).

The present invention therefore also provides a process in which the first molding (1a) is positioned in step d) in such a way that if the distance (Xa) is in the range from >0 mm to 3 mm outside the duct (7a), the location of the end (2a) is entirely in the exterior duct region (17a) and/or the second molding (1b) is positioned in step e) in such a way that if the distance (Xb) is in the range from >0 mm to 3 mm outside the duct (7b), the location of the junction area (2b) is entirely in the exterior duct region (17b).

It is self-evident that the distance (Xb) inside the duct (7b) is always smaller than the depth of the duct (7b).

If the distance (Xb) is in the range from 0 mm to 10 mm inside the duct (7b), the second molding (1b) additionally has a first lateral area (3b) and a second lateral area (4b) In this case in the invention, the minimal distance (Y1b) of the first lateral area (3b) from the first duct wall (8b) is in the range from 0.2 to 5 mm. In this case, the minimal distance (Y2b) of the second lateral area (4b) from the second duct wall (9b) is in the range from 0.2 to 5 mm.

The minimal distance (Y1b) preferably is in the range from 0.5 to 4 mm and with particular preference in the range from 1 to 3 mm.

The minimal distance (Y2b) preferably is in the range from 0.5 to 4 mm and with particular preference in the range from 1 to 3 mm.

The minimal distance (Y1b) of the first lateral area (3b) from the first duct wall (8b) is the smallest distance between the first lateral area (3b) and the first duct wall (8b).

Corresponding considerations apply to the minimal distance (Y2b). The minimal distance (Y2b) of the second lateral area (4b) from the second duct wall (9b) is the smallest distance between the second lateral area (4b) and the second duct wall (9b).

Figure 4:
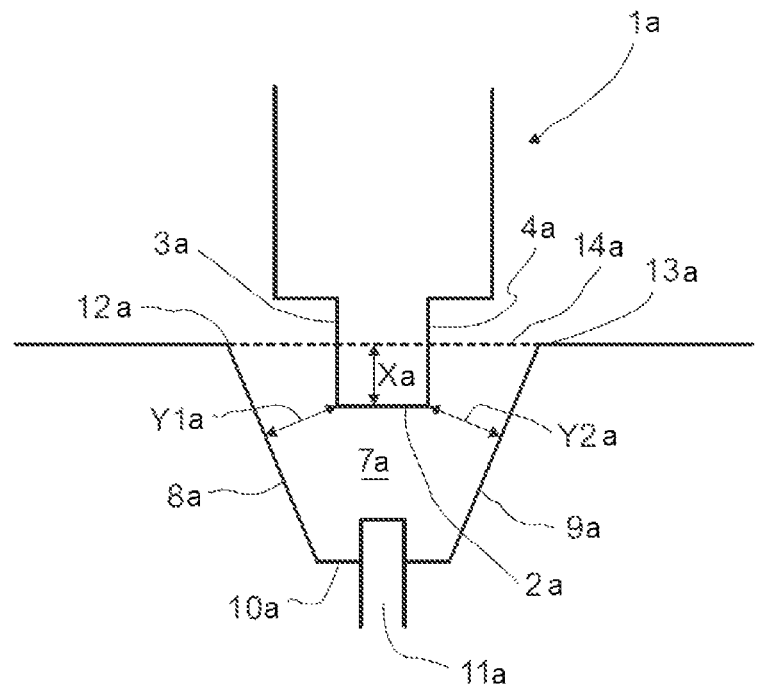
FIG. 4 shows a molding and a duct in accordance with the present disclosure.

FIG. 4 shows an example of a molding (1a), and also an example of a duct (7a); the distance (Xa), and also the distances (Y1a) and (Y2a), are shown with reference to these.

The distance (Xa) is the distance of the end (2a) of the molding (1a) from the duct-entry plane (14a) in a direction running perpendicularly to the duct-entry plane (14a). The minimal distance (Y1a) is the shortest distance between the first lateral area (3a) and the first duct wall (8a). The minimal distance (Y2a) is the shortest distance between the second lateral area (4a) and the second duct wall (9a).

Figure 8:
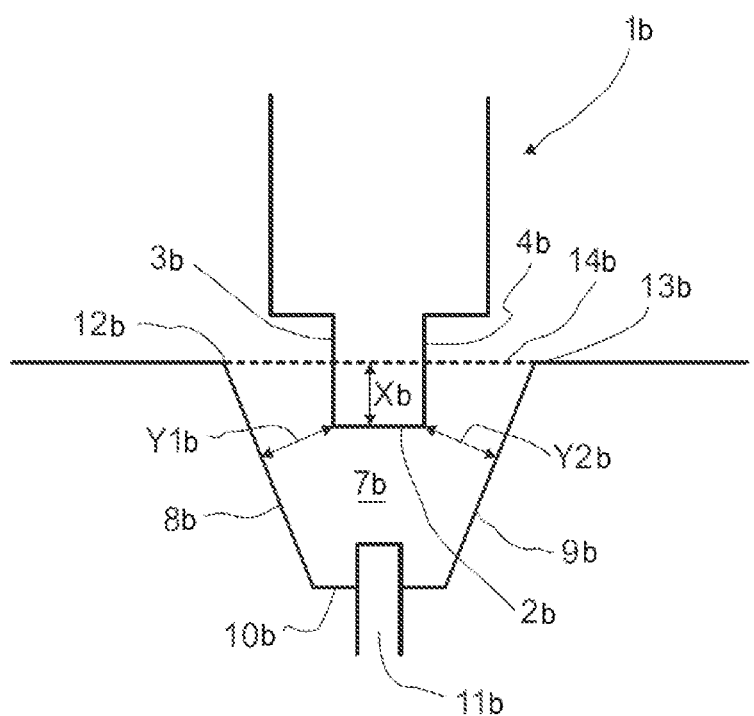
FIG. 8 shows a molding and a duct in accordance with the present disclosure.

FIG. 8 shows an example of a molding (1b), and also an example of a duct (7b); the distance (Xb), and also the distances (Y1b) and (Y2b), are shown with reference to these. The statements and preferences above relating to FIG. 4 then apply correspondingly to FIG. 8.
Step f)

In step f) a hot gas is introduced via the means (11a) for the introduction of gas into the duct (7a). The temperature of the end (2a) of the first molding (1a) increases here, and the first thermoplastic polymer comprised in the end (2a) melts.

For the purposes of the present invention, the expression "a hot gas" means either precisely one hot gas or else a mixture of two or more hot gases.

It is self-evident that in step f) the environment around the end (2a) can also be heated. This is in particular the case when the shape of the end (2a) is linear or angular.

In this embodiment it is preferable that the first molding (1a) comprises the first thermoplastic polymer and then also that the first thermoplastic polymer in the environment around the end (2a) melts.

Any of the methods known to the person skilled in the art can be used to introduce the hot gas to the means (11a) for the introduction of gas into the duct (7a). The hot gas is usually introduced via the central section (20) to the means (11a) for the introduction of gas into the duct (7a).

A suitable hot gas is any of the gases known to the person skilled in the art. These gases are selected by way of example from the group consisting of $CO_2$, $N_2$ and air.

The present invention therefore also provides a process in which the hot gas which is introduced in step f) is selected from the group consisting of $CO_2$, $N_2$ and air.

For the purposes of the present invention, the term "air" means the gas mixture of the Earth's atmosphere. This mixture is known to the person skilled in the art.

Any of the methods known to the person skilled in the art can be used to heat the hot gas. By way of example, it can be heated via the central section (20); it is likewise possible that it is introduced after previous heating. It is moreover by way of example possible that the hot gas is $CO_2$, that the hot gas is produced in situ by combustion of hydrocarbons, and that it is hot for this reason.

The temperature of the hot gas is by way of example in the range from 100 to 600° C., preferably in the range from 250 to 500° C. and with particular preference in the range from 300 to 500° C.

The present invention therefore also provides a process in which the temperature of the hot gas which is introduced in step f) is in the range from 100 to 600° C.

It is self-evident that the temperature of the hot gas which is introduced in step f) refers to the temperature of the hot gas on discharge from the means (11a) for the introduction of a gas into the duct (7a), i.e. to the temperature of the hot gas in the duct (7a).

The end (2a) of the first molding (1a) can be heated in step f) to any desired temperature ($T_{1a}$). The temperature ($T_{1a}$) is usually below the decomposition temperature of the first thermoplastic polymer comprised in the end (2a). The temperature ($T_{1a}$) to which the end (2a) of the first molding (1a) is heated in step f) is preferably above the glass transition temperature ($T_{G1}$) of the first thermoplastic polymer comprised in the end (2a) if the first thermoplastic polymer is an amorphous thermoplastic polymer, and is above the melting point ($T_{M1}$) of the first thermoplastic polymer comprised in the end (2a) if the first thermoplastic polymer is a semicrystalline thermoplastic polymer.

The present invention therefore also provides a process in which the temperature ($T_{1a}$) to which the temperature of the end (2a) of the first molding (1a) increases in step f) is above the glass transition temperature ($T_{G1}$) of the first thermoplastic polymer comprised in the end (2a) if the first thermoplastic polymer is an amorphous thermoplastic polymer, and is above the melting point ($T_{M1}$) of the first thermoplastic polymer comprised in the end (2a) if the first thermoplastic polymer is a semicrystalline thermoplastic polymer.

By way of example, the temperature ($T_{1a}$) to which the temperature of the end (2a) of the first molding (1a) is increased is in the range from 0 to 300° C., preferably in the range from 30 to 250° C. and with particular preference in the range from 60 to 200° C. above the glass transition temperature ($T_{G1}$) of the first thermoplastic polymer comprised in the end (2a) if the first thermoplastic polymer is an amorphous thermoplastic polymer, and is in the range from 0 to 300° C., preferably in the range from 30 to 250° C. and with particular preference in the range from 60 to 200° C. above the melting point ($T_{M1}$) of the first thermoplastic polymer comprised in the end (2a) if the first thermoplastic polymer is a semicrystalline thermoplastic polymer.

The present invention therefore also provides a process in which the temperature ($T_{1a}$) to which the temperature of the end (2a) of the first molding (1a) increases in step f) is in the range from 0 to 300° C. above the glass transition temperature ($T_{G1}$) of the first thermoplastic polymer comprised in the end (2a) if the first thermoplastic polymer is an amorphous thermoplastic polymer, and is in the range from 0 to 300° C. above the melting point ($T_{M1}$) of the first thermoplastic polymer comprised in the end (2a) if the first thermoplastic polymer is a semicrystalline thermoplastic polymer.

By way of example, the temperature ($T_{1a}$) to which the temperature of the end (2a) of the first molding (1a) increases in the range from 100 to 500° C.

The present invention therefore also provides a process in which the temperature ($T_{1a}$) to which the temperature of the end (2a) of the first molding (1a) increases in step f) is in the range from 100 to 500° C.

The first thermoplastic polymer melts in step f).

For the purposes of the present invention, the expression "to melt" in the context of the first thermoplastic polymer and likewise in the context of the second thermoplastic polymer means that the first thermoplastic polymer and, respectively, the second thermoplastic polymer is flowable.

Step g)

In step g) a hot gas is introduced via the means (11b) for the introduction of gas into the duct (7b). The temperature of the junction area (2b) of the second molding (1b) increases here, and the second thermoplastic polymer comprised in the junction area (2b) melts.

For the purposes of the present invention, the expression "a hot gas" means either precisely one hot gas or else a mixture of two or more hot gases.

The statements and preferences above for step f) apply correspondingly to step g).

The present invention therefore also provides a process in which the temperature ($T_{1b}$) to which the temperature of the junction area (2b) increases in step g) is above the glass transition temperature ($T_{G2}$) of the second thermoplastic polymer comprised in the junction area (2b) if the second thermoplastic polymer is an amorphous thermoplastic polymer, and is above the melting point ($T_{M2}$) of the second thermoplastic polymer comprised in the junction area (2b) if the second thermoplastic polymer is a semicrystalline thermoplastic polymer.

The present invention therefore also provides a process in which the temperature ($T_{1a}$) to which the temperature of the end (2a) of the first molding (1a) increases in step f) is above the glass transition temperature ($T_{G1}$) of the first thermoplastic polymer comprised in the end (2a) if the first thermoplastic polymer is an amorphous thermoplastic polymer, and is above the melting point ($T_{M1}$) of the first thermoplastic polymer comprised in the end (2a) if the first thermoplastic polymer is a semicrystalline thermoplastic polymer, and/or the temperature ($T_{1b}$) to which the temperature of the junction area (2b) increases in step g) is above the glass transition temperature ($T_{G2}$) of the second thermoplastic polymer comprised in the junction area (2b) if the second thermoplastic polymer is an amorphous thermoplastic polymer, and is above the melting point ($T_{M2}$) of the second thermoplastic polymer comprised in the junction area (2b) if the second thermoplastic polymer is a semicrystalline thermoplastic polymer.

By way of example, the temperature ($T_{1b}$) to which the temperature of the junction area (2b) of the second molding (1b) increases is in the range from 0 to 300° C., preferably in the range from 30 to 250° C. and with particular preference in the range from 60 to 200° C. above the glass transition temperature ($T_{G2}$) of the second thermoplastic polymer comprised in the junction area (2b) if the second thermoplastic polymer is an amorphous thermoplastic polymer, and is in the range from 0 to 300° C., preferably in the range from 30 to 250° C. and with particular preference in the range from 60 to 200° C. above the melting point ($T_{M2}$)

of the second thermoplastic polymer comprised in the junction area (2b) if the second thermoplastic polymer is a semicrystalline thermoplastic polymer.

The present invention therefore also provides a process in which the temperature ($T_{1b}$) to which the temperature of the junction area (2b) of the second molding (1b) increases in step g) is in the range from 0 to 300° C. above the glass transition temperature ($T_{G2}$) of the second thermoplastic polymer comprised in the junction area (2b) if the second thermoplastic polymer is an amorphous thermoplastic polymer, and is in the range from 0 to 300° C. above the melting point ($T_{M2}$) of the second thermoplastic polymer comprised in the junction area (2b) if the second thermoplastic polymer is a semicrystalline thermoplastic polymer.

The present invention moreover comprises a process in which the temperature ($T_{1a}$) to which the temperature of the end (2a) of the molding (1a) increases in step is in the range from 0 to 300° C. above the glass transition temperature ($T_{G1}$) of the first thermoplastic polymer comprised in the end (2a) if the first thermoplastic polymer is an amorphous thermoplastic polymer, and is in the range from 0 to 300° C. above the melting point ($T_{M1}$) of the first thermoplastic polymer comprised in the end (2a) if the first thermoplastic polymer is a semicrystalline thermoplastic polymer, and/or the temperature ($T_{1b}$) to which the temperature of the junction area (2b) of the second molding (1b) increases in step g) is in the range from 0 to 300° C. above the glass transition temperature ($T_{G2}$) of the second thermoplastic polymer comprised in the junction area (2b) if the second thermoplastic polymer is an amorphous thermoplastic polymer, and is in the range from 0 to 300° C. above the melting point ($T_{M2}$) of the second thermoplastic polymer comprised in the junction area (2b) if the second thermoplastic polymer is a semicrystalline thermoplastic polymer.

The present invention moreover provides a process in which the temperature ($T_{1b}$) to which the temperature of the junction area (2b) of the second molding (1b) increases in step g) is in the range from 100 to 500° C.

The present invention moreover provides a process in which the hot gas which is introduced in step g) is selected from the group consisting of $CO_2$, $N_2$ and air.

The present invention therefore also provides a process in which the hot gas which is introduced in step is selected from the group consisting of $CO_2$, $N_2$ and air and/or the hot gas which is introduced in step g) is selected from the group consisting of $CO_2$, $N_2$ and air.

The present invention moreover provides a process in which the temperature of the hot gas which is introduced in step g) is in the range from 100 to 600° C.

The present invention moreover provides a process in which the temperature of the hot gas which is introduced in step f) is in the range from 100 to 600° C. and/or the temperature of the hot gas which is introduced in step g) is in the range from 100 to 600° C.

It is self-evident that the temperature of the hot gas which is introduced in step g) refers to the temperature of the hot gas on discharge from the means (11b) for the introduction of a gas into the duct (7b), i.e. to the temperature of the hot gas in the duct (7b).

Step h) and i)

In step h) the first molding (1a) is removed from the position achieved in step d). In step i) the second molding (1b) is removed from the position achieved in step e).

Any of the methods known to the person skilled in the art can be used for the removal of the first molding (1a) from the position achieved in step d) and of the second molding (1b) from the position achieved in step e). By way of example, it is possible that the first molding (1a) and the second molding (1b) are respectively moved and removed from the position. It is likewise possible that the implement (5) is removed while the first molding (1a) and the second molding (1b) are not moved, and that the first molding (1a) and the second molding (1b) are thus removed from their positions. It is moreover possible that the first molding (1a) and/or the second molding (1b) is/are removed from position while at the same time the implement (5) is removed.

These processes are known per se to the person skilled in the art.

Step j)

In step j) the heated end (2a) of the first molding (1a) is brought into contact with the heated junction area (2b) of the second molding (1b). The heated end (2a) of the first molding (1a) and the heated junction area (2b) of the second molding (1b) are cooled while the heated end (2a) and the heated junction area (2b) are in contact with one another. A weld forms here between the first molding (1a) and the second molding (1b). A welded molding is obtained.

The expression "bring into contact" here means that the heated end (2a) of the first molding (1a) touches the heated junction area (2b) of the second molding (1b).

It is possible that the heated end (2a) of the first molding (1a) is brought into contact under pressure with the heated junction area (2b) of the second molding (1b) in such a way that the heated end (2a) of the first molding (1a) and the heated junction area (2b) of the second molding (1b) are pressed against one another. Processes for this are known to the person skilled in the art.

By way of example, the pressure when the heated end (2a) of the first molding (1a) is brought into contact with the junction area (2b) of the second molding (1b) is in the range from 0.1 to 10 MPa, preferably in the range from 0.5 to 6 MPa.

Any of the methods known to the person skilled in the art can be used for the cooling of the heated end (2a) of the first molding (1a) and of the heated junction area (2b) of the second molding (1b) in step j). The cooling can by way of example take place in air or under water.

It is preferable that the temperature ($T_{2a}$) to which the heated end (2a) of the first molding (1a) is cooled in step j) is below the glass transition temperature ($T_{G1}$) of the first thermoplastic polymer comprised in the end (2a) if the first thermoplastic polymer is an amorphous thermoplastic polymer, and is below the melting point ($T_{M1}$) of the first thermoplastic polymer comprised in the end (2a) if the first thermoplastic polymer is a semicrystalline thermoplastic polymer.

The present invention therefore also provides a process in which the temperature ($T_{2a}$) to which the heated end (2a) of the first molding (1a) is cooled in step j) is below the glass transition temperature ($T_{G1}$) of the first thermoplastic polymer comprised in the end (2a) if the first thermoplastic polymer is an amorphous thermoplastic polymer, and is below the melting point ($T_{M1}$) of the first thermoplastic polymer comprised in the end (2a) if the first thermoplastic polymer is a semicrystalline thermoplastic polymer.

By way of example, the temperature ($T_{2a}$) to which the heated end (2a) of the first molding (1a) is cooled in step j) is in the range from 20 to 400° C.

The present invention therefore also provides a process in which the temperature ($T_{2a}$) to which the heated end (2a) of the first molding (1a) is cooled in step j) is in the range from 20 to 400° C.

It is self-evident that the temperature ($T_{2a}$) to which the heated end (2a) is cooled in step j) is below the temperature ($T_{1a}$) to which the end (2a) is heated in step f).

The present invention therefore also provides a process in which the temperature ($T_{2a}$) to which the heated end (2a) is cooled in step j) is below the temperature ($T_{1a}$) to which the end (2a) is heated in step f).

It is preferable that the temperature ($T_{2b}$) to which the heated junction area (2b) of the second molding (1b) is cooled in step j) is below the glass transition temperature ($T_{G2}$) of the second thermoplastic polymer comprised in the junction area (2b) if the second thermoplastic polymer is an amorphous thermoplastic polymer, and is below the melting point ($T_{M2}$) of the second thermoplastic polymer comprised in the junction area (2b) if the second thermoplastic polymer is a semicrystalline thermoplastic polymer.

The present invention therefore also provides a process in which the temperature ($T_{2b}$) to which the heated junction area (2b) of the second molding (1b) is cooled in step j) is below the glass transition temperature ($T_{G2}$) of the second thermoplastic polymer comprised in the junction area (2b) if the second thermoplastic polymer is an amorphous thermoplastic polymer, and is below the melting point ($T_{M2}$) of the second thermoplastic polymer comprised in the junction area (2b) if the second thermoplastic polymer is a semicrystalline thermoplastic polymer.

The present invention therefore also provides a process in which the temperature ($T_{2a}$) to which the heated end (2a) of the first molding (1a) is cooled in step j) is below the glass transition temperature ($T_{G1}$) of the first thermoplastic polymer comprised in the end (2a) if the first thermoplastic polymer is an amorphous thermoplastic polymer, and is below the melting point ($T_{M1}$) of the first thermoplastic polymer comprised in the end (2a) if the first thermoplastic polymer is a semicrystalline thermoplastic polymer, and/or the temperature ($T_{2b}$) to which the heated junction area (2b) of the second molding (1b) is cooled in step j) is below the glass transition temperature ($T_{G2}$) of the second thermoplastic polymer comprised in the junction area (2b) if the second thermoplastic polymer is an amorphous thermoplastic polymer, and is below the melting point ($T_{M2}$) of the second thermoplastic polymer comprised in the junction area (2b) if the second thermoplastic polymer is a semicrystalline thermoplastic polymer.

The temperature ($T_{2b}$) to which the junction area (2b) of the second molding (1b) is cooled in step j) is by way of example in the range from 20 to 400° C.

The present invention therefore also provides a process in which the temperature ($T_{2b}$) to which the junction area (2b) of the second molding (1b) is cooled in step j) is in the range from 20 to 400° C.

It is self-evident that the temperature ($T_{2b}$) to which the heated junction area (2b) is cooled in step j) is below the temperature ($T_{1b}$) to which the junction area (2b) is heated in step g).

The present invention therefore also provides a process in which the temperature ($T_{2b}$) to which the heated junction area (2b) is cooled in step j) is below the temperature ($T_{1b}$) to which the junction area (2b) is heated in step g).

It is preferable that the temperature ($T_{2a}$) to which the end (2a) is cooled is the same as the temperature ($T_{2b}$) of the junction area (2b). The temperature ($T_{2a}$) is then the same as the temperature ($T_{2b}$).

In step j) a weld forms between the first molding (1a) and the second molding (1b). The location of the weld is in the region that originally comprised the end (2a) of the first molding (1a) and the junction area (2b) of the second molding (1b).

A weld is known per se to the person skilled in the art.

The thickness of the weld between the first molding (1a) and the second molding (1b) is by way of example in the range from 20 to 500 µm, preferably in the range from 30 to 400 µm and most preferably in the range from 30 to 300 µm, determined by means of micrographs.

The present invention therefore also provides a process in which the thickness of the weld formed in step j) between the first molding (1a) and the second molding (1b) is from 20 to 500 µm.

A welded molding is therefore obtained in step j). This welded molding features a particularly homogeneous weld and good mechanical properties.

The present invention therefore also provides a welded molding obtainable by the process of the invention.

The present invention is explained in more detail below with reference to examples, without restriction thereto.

EXAMPLES

Molding (1a, 1b) used in inventive example IE1 and comparative example CE2 was a PA 6 GF 30 sheet (polyamide 6 with 30% of glass fiber) with thickness 4 mm.

Inventive Example IE1

An implement (5) was used with the first external area (6a) opposite to the second external area (6b) and with the duct (7a) of the first external area (6a) opposite to the duct (7b) of the second external area (6b). The orientation of the first duct wall (8a, 8b) and of the second duct wall (9a, 9b) was respectively perpendicular to the floor (10a, 10b) and parallel to one another, the distance between the first duct wall (8a, 8b) and the second duct wall (9a, 9b) being respectively 6 mm. The floor (10a, 10b) comprised nozzles as means (11a, 11b) for the introduction of gas into the duct (7a, 7b). The moldings (1a, 1b) were positioned at a distance (X) of 3.5 mm from the duct-entry plane (14a, 14b) inside the duct (7a, 7b), and the distance (Y1) of the first lateral area (3a, 3b) of the moldings (1a, 1b) from the first duct wall (8a, 8b) and the distance (Y2) of the second lateral area (4a, 4b) of the moldings (1a, 1b) from the second duct wall (9a, 9b) was respectively 1 mm. The distance of the end (2a, 2b) of the moldings (1a, 1b) from the highest point of the means (11a, 11b) for the introduction of gas (the nozzles) was 5 mm.

Comparative Example CE2

An implement (5) was used with the first external area (6a) opposite to the second external area (6b) and with the duct (7a) of the first external area (6a) opposite to the duct (7b) of the second external area (6b). The orientation of the first duct wall (8a, 8b) and of the second duct wall (9a, 9b) was respectively perpendicular to the floor (10a, 10b) and parallel to one another, the distance between the first duct wall (8a, 8b) and the second duct wall (9a, 9b) being respectively 16 mm. The floor (10a, 10b) comprised nozzles as means (11a, 11b) for the introduction of gas into the duct (7a, 7b). The moldings (1a, 1b) were positioned at a distance (X) of 3.5 mm from the duct-entry plane (14a, 14b) inside the duct (7a, 7b), and the distance (Y1) of the first lateral area (3a, 3b) of the moldings (1a, 1b) from the first duct wall (8a, 8b) and the distance (Y2) of the second lateral area (4a, 4b) of the moldings (1a, 1b) from the second duct wall (9a, 9b) was respectively 6 mm. The distance of the end (2a, 2b) of the moldings (1a, 1b) from the highest point of the means (11a, 11b) for the introduction of gas (the nozzles) was 5 mm.

The thickness (d) of the layer of molten first thermoplastic polymer formed when the end (2a) of the first molding (1a) was heated was determined. To this end the first molding (1a) and the second molding (1b) were respectively positioned as described above in the duct (7a) of the first external area (6a) and the duct (7b) of the second external area (6b). Only the end (10a) of the first molding (1a) was then heated, nitrogen at a temperature of 430° C. being introduced here into the duct (7a) of the first external area (6a) through the nozzle at a flow rate of 1 l/min per nozzle. The time (t in s) during which the gas was introduced is also termed plastification time. This was varied. The melt layer thickness (d in mm) was then determined as a function of the plastification time by bringing the end (2a) of the first molding (1a) into contact with the junction area (2b) of the second molding (1b) and pressing the two entities together, the compression force being 1180 N. The displacement occurring when the first and second molding (1a, 1b) were pressed together was determined, and is also termed junction displacement. It corresponds to the melt layer thickness (d). The junction area (2b) of the second molding (1b) was therefore not melted in order to determine the melt layer thickness (d).

The results for inventive example IE1 can be seen in table 1, and the results for comparative example CE2 can be seen in table 2.

TABLE 1

| t [s] | d [mm] |
|---|---|
| 3 | 0.09 |
| 5 | 0.30 |
| 10 | 0.83 |
| 15 | 1.34 |
| 20 | 1.71 |
| 25 | 2.04 |

TABLE 2

| t [s] | d [mm] |
|---|---|
| 5 | 0.13 |
| 10 | 0.53 |
| 15 | 1.04 |
| 20 | 1.36 |
| 25 | 1.66 |
| 30 | 1.91 |

Figure 5:
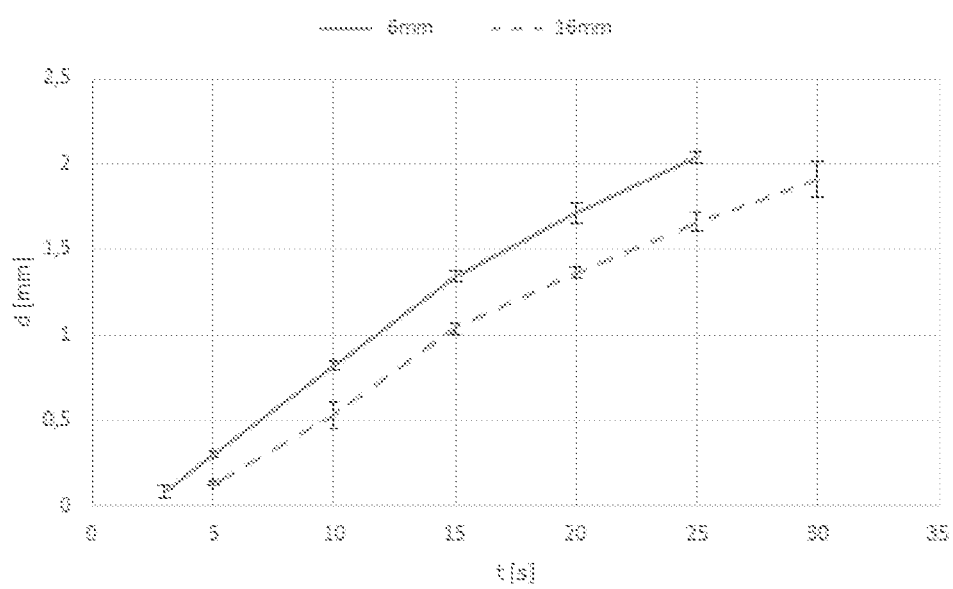
FIG. 5 shows the melt layer thickness (d) as a function of the plastification time (t) in accordance with the present disclosure.
Figure 6A:
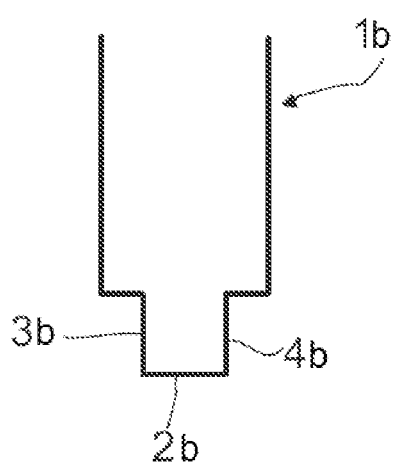
FIGS. 6a, 6b, 6c, 6d, and 6e show moldings in accordance with the present disclosure.
Figure 6B:
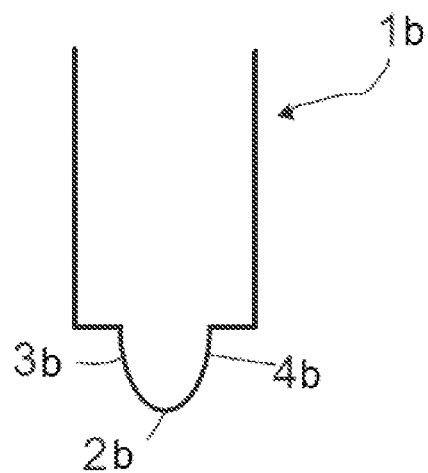
Figure 6C:
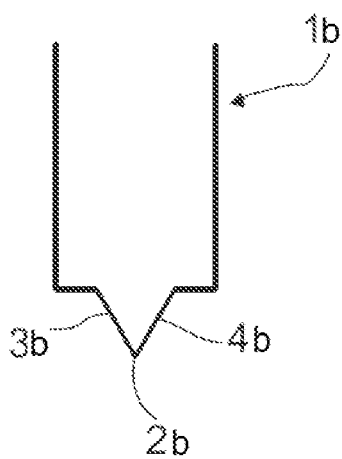
Figure 6D:
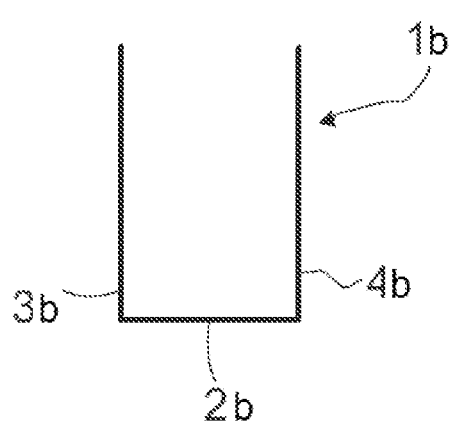
Figure 6E:
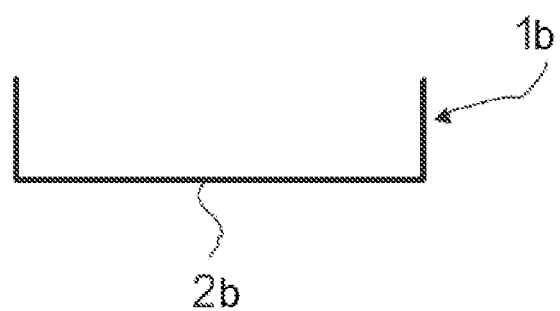
Figure 7A:
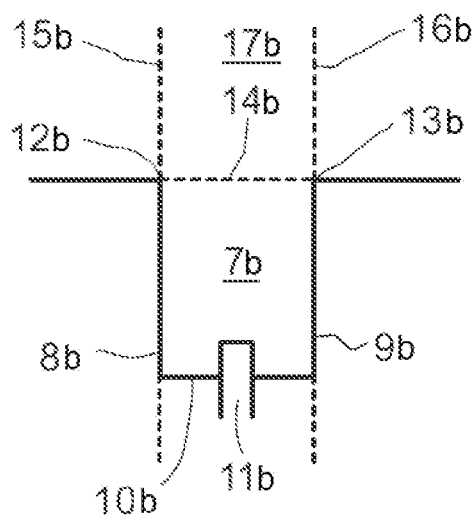
FIGS. 7a, 7b, 7c, and 7d show ducts in accordance with the present disclosure.
Figure 7B:
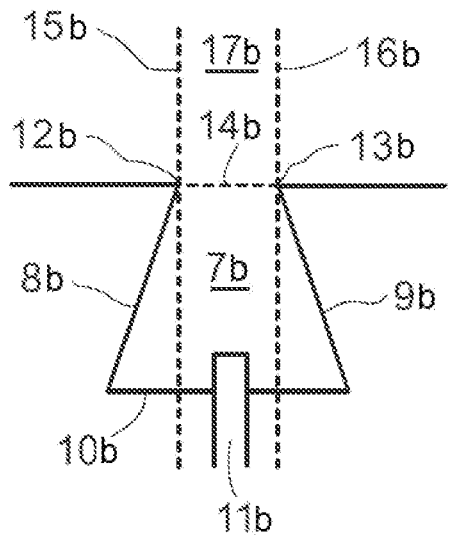
Figure 7C:
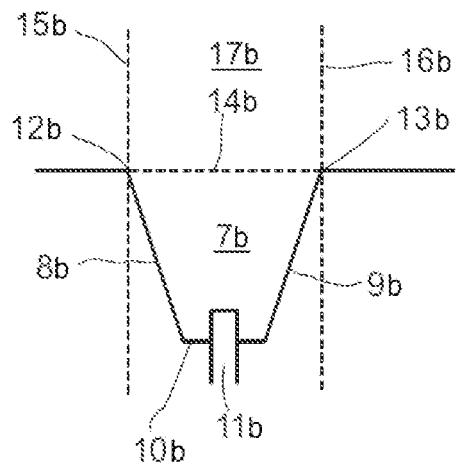
Figure 7D:
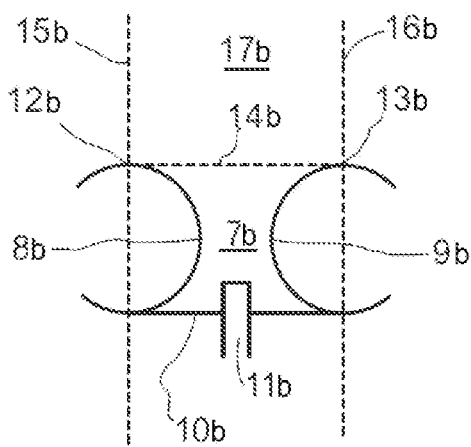

FIG. 5 moreover shows the melt layer thickness (d) as a function of the plastification time (t). It can be seen that a greater thickness of the melt layer is achieved more rapidly by the process of the invention, i.e. the first thermoplastic polymer comprised in the end (2a) and, respectively, the second thermoplastic polymer comprised in the junction area (2b) melt more rapidly when the process of the invention is used than when processes of the type described in the prior art are used. The melt layer is moreover more homogeneous.

The invention claimed is:

1. A process for the welding of a first molding (11a) to a second molding (1b),
where the first molding (1a) comprises a first lateral area (3a), a second lateral area (4a) and an end (2a), which comprises a first thermoplastic polymer, and
where the second molding (1b) comprises a junction area (2b) which comprises a second thermoplastic polymer, comprising the steps of
a) provision of the first molding (1a),
b) provision of the second molding (1b),
c) provision of an implement (5) which has a first external area (6a) and a second external area (6b),
where the first external area (6a) comprises a duct (7a), and where the duct (7a) has a floor (10a), a first duct wall (8a) with a first highest point (12a) and a second duct wall (9a) with a second highest point (13a), where the floor (10a) comprises a means (11a) for the introduction of gas into the duct (7a), where a duct-entry plane (14a) runs through the first highest point (12a) parallel to the first external area (6a) and where the location of an exterior duct region (17a) is between a projection line (15a) from the first highest point (12a) along a direction running perpendicularly to the duct-entry plane (14a) and a projection line (16a) from the second highest point (13a) along a direction running perpendicularly to the duct-entry plane (14a),
where the second external area (6b) comprises a duct (7b), and where the duct (7b) has a floor (10b), a first duct wall (8b) with a first highest point (12b) and a second duct wall (9b) with a second highest point (13b), where the floor (10b) comprises a means (11b) for the introduction of gas into the duct (7b), where a duct-entry plane (14b) runs through the first highest point (12b) parallel to the second external area (6b) and where the location of the exterior duct region (17b) is between a projection line (15b) from the first highest point (12b) along a direction running perpendicularly to the duct-entry plane (14b) and a projection line (16b) from the second highest point (13b) along a direction running perpendicularly to the duct-entry plane (14b),
d) positioning of the first molding (1a), where
a distance (Xa) of the end (2a) from the duct-entry plane (14a) in a direction running perpendicularly to the duct-entry plane (14a) is in the range from 3 mm outside the duct (7a) to 10 mm inside the duct (7a), where
if the distance (Xa) is in the range from >0 mm to 3 mm outside the duct (7a), the location of the end (2a) is at least to some extent in the exterior duct region (17a),
and if the distance (Xa) is in the range from 0 mm to 10 mm inside the duct (7a), a minimal distance (Y1a) of the first lateral area (3a) from the first duct wall (8a) is in the range from 0.2 to 5 mm, and a minimal distance (Y2a) of the second lateral area (4a) from the second duct wall (9a) is in the range from 0.2 to 5 mm,
e) positioning of the second molding (1b), where
a distance (Xb) of the junction area (2b) from the duct-entry plane (14b) in a direction running perpendicularly to the duct-entry plane (14b) is in the range from 3 mm outside the duct (7b) to 10 mm inside the duct (7b), where if the distance (Xb) is in the range from >0 mm to 3 mm outside the duct (7b), the junction area (2b) is at least to some extent in the exterior duct region (17b), and if the distance (Xb) is in the range from 0 mm to 10 mm inside the duct (7b), the second molding (1b) additionally has a first lateral area (3b) and a second lateral area (4b) and a minimal distance (Y1b) of the first lateral area (3b) from the first duct wall (8b) is in the range from 0.2 to 5 mm, and where a minimal distance (Y2b) of the second lateral area (4b) from the second duct wall (9b) is in the range from 0.2 to 5 mm, f) introduction of a hot gas via the means (11a) for the introduction of gas into the duct (7a), where the temperature of the end (2a) of the first molding (1a) increases to a temperature $T_{1a}$ and where the first thermoplastic polymer comprised in the end (2a) melts, g) introduction of a hot gas via the means (11b) for the introduction of gas into the duct (7b), where the temperature of the junction area (2b) of the second molding (1b) increases to a temperature $T_{1b}$ and where the second thermoplastic polymer comprised in the junction area (2b) melts, h) removal of the first molding (1a) from the position achieved in step d), i) removal of the second molding (1b) from the position achieved in step e), j) bringing of the heated end (2a) of the first molding (1a) into contact with the heated junction area (2b) of the second molding (1b) and cooling of the heated end (2a) of the first molding (1a) to a temperature $T_{2a}$ and of the heated junction area (2b) of the second molding (1b) to a temperature $T_{2b}$ while the heated end (2a) and the heated junction area (2b) are in contact with one another to form a weld between the first molding (1a) and the second molding (1b).

2. The process according to claim 1, wherein the temperature ($T_{1a}$) to which the temperature of the end (2a) of the first molding (11a) increases in step f) is above the glass transition temperature (TO of the first thermoplastic polymer comprised in the end (2a) if the first thermoplastic polymer is an amorphous thermoplastic polymer, and is above a the melting point ($T_{M1}$) of the first thermoplastic polymer comprised in the end (2a) if the first thermoplastic polymer is a semicrystalline thermoplastic polymer, and/or the temperature ($T_{1b}$) to which the temperature of the junction area (2b) increases in step g) is above the glass transition temperature ($T_{G2}$) of the second thermoplastic polymer comprised in the junction area (2b) if the second thermoplastic polymer is an amorphous thermoplastic polymer, and is above the melting point ($T_{M2}$) of the second thermoplastic polymer comprised in the junction area (2b) if the second thermoplastic polymer is a semicrystalline thermoplastic polymer.

3. The process according to claim 1, wherein the first thermoplastic polymer comprised in the end (2a) is selected from the group consisting of polyamides, polyoxymethylenes, polysulfone, polyphenyl sulfone and polybutylene terephthalates, and/or the second thermoplastic polymer comprised in the junction area (2b) is selected from the group consisting of polyamides, polyoxymethylenes, polysulfone, polyphenyl sulfone and polybutylene terephthalates.

4. The process according to claim 1, wherein the first thermoplastic polymer comprised in the end (2a) and the second thermoplastic polymer comprised in the junction area (2b) are identical.

5. The process according to claim 1, wherein the temperature ($T_{1a}$) to which the temperature of the end (2a) of the first molding (11a) increases in step f) is in the range from 0 to 300° C. above the glass transition temperature (TO of the first thermoplastic polymer comprised in the end (2a) if the first thermoplastic polymer is an amorphous thermoplastic polymer, and is in the range from 0 to 300° C. above the melting point ($T_{M1}$) of the first thermoplastic polymer comprised in the end (2a) if the first thermoplastic polymer is a semicrystalline thermoplastic polymer, and/or the temperature ($T_{1b}$) to which the temperature of the junction area (2b) of the second molding (1b) increases in step g) is in the range from 0 to 300° C. above the glass transition temperature ($T_{G2}$) of the second thermoplastic polymer comprised in the junction area (2b) if the second thermoplastic polymer is an amorphous thermoplastic polymer, and is in the range from 0 to 300° C. above the melting point ($T_{M2}$) of the second thermoplastic polymer comprised in the junction area (2b) if the second thermoplastic polymer is a semicrystalline thermoplastic polymer.

6. The process according to claim 1, wherein the first external area (6a) of the implement (5) provided in step c) is opposite to the second external area (6b) of the implement (5).

7. The process according to claim 1, wherein an orientation of the first duct wall (8a) of the duct (7a) of the first external area (6a) is in essence parallel to the second duct wall (9a) of the duct (7a) of the first external area (6a) and/or an orientation of the first duct wall (8b) of the duct (7b) of the second external area (6b) is in essence parallel to the second duct wall (9b) of the duct (7b) of the second external area (6b).

8. The process according to claim 1, wherein the first molding (1a) is positioned in step d) in such a way that if the distance (Xa) is in the range from >0 mm to 3 mm outside the duct (7a), the location of the end (2a) is entirely in the exterior duct region (17a) and/or the second molding (1b) is positioned in step e) in such a way that if the distance (Xb) is in the range from >0 mm to 3 mm outside the duct (7b), the location of the junction area (2b) is entirely in the exterior duct region (17b).

9. The process according to claim 1, wherein the first molding (1a) is positioned in step d) in such a way that the distance (Xa) is in the range from 0 to 10 mm inside the duct (7a).

10. The process according to claim 1, wherein the hot gas which is introduced in step f) is selected from the group consisting of $CO_2$, $N_2$ and air and/or the hot gas which is introduced in step g) is selected from the group consisting of $CO_2$, $N_2$ and air.

11. The process according to claim 1, wherein the temperature of the hot gas which is introduced in step f) is in the range from 100 to 600° C. and/or the temperature of the hot gas which is introduced in step g) is in the range from 100 to 600° C.

12. The process according to claim 1, wherein the temperature ($T_{2a}$) to which the heated end (2a) of the first molding (1a) is cooled in step j) is below the glass transition temperature (TO of the first thermoplastic polymer comprised in the end (2a) if the first thermoplastic polymer is an amorphous thermoplastic polymer, and is below the melting point ($T_{M1}$) of the first thermoplastic polymer comprised in the end (2a) if the first thermoplastic polymer is a semicrystalline thermoplastic polymer, and/or the temperature ($T_{2b}$) to which the junction area (2b) of the second molding (1b) is cooled in step j) is below the glass transition temperature ($T_{G2}$) of the second thermoplastic polymer comprised in the junction area (2*b*) if the second thermoplastic polymer is an amorphous thermoplastic polymer, and is below the melting point ($T_{M2}$) of the second thermoplastic polymer comprised in the junction area (2*b*) if the second thermoplastic polymer is a semicrystalline thermoplastic polymer.

13. The process according to claim 1, wherein the thickness of the weld formed in step j) between the first molding (1*a*) and the second molding (1*b*) is in the range from 20 to 500 μm.

\* \* \* \* \*